Jan. 26, 1960 J. H. WILLWERTH ET AL 2,922,549
FERTILIZER DISTRIBUTOR
Filed Sept. 17, 1957 2 Sheets-Sheet 1

INVENTORS
JOHN H. WILLWERTH
& JAMES R. WEST

Joseph Allen Brown
ATTORNEY

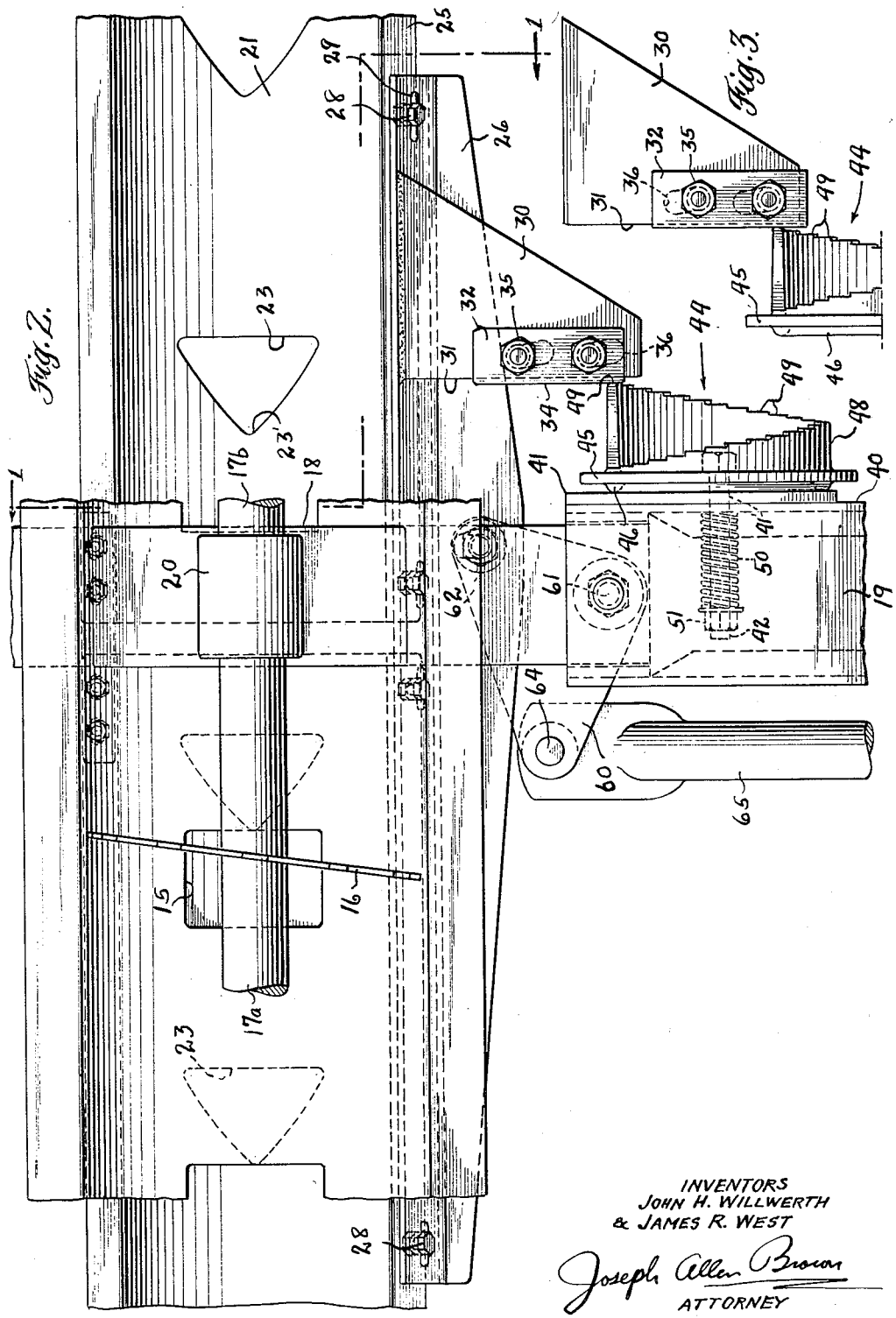

United States Patent Office 2,922,549
Patented Jan. 26, 1960

2,922,549

FERTILIZER DISTRIBUTOR

John H. Willwerth, Ephrata, and James R. West, New Holland, Pa., assignors to Sperry Rand Corporation, New Holland, Pa., a corporation of Delaware Application September 17, 1957, Serial No. 684,518

7 Claims. (Cl. 222—43)

The present invention relates generally to fertilizer distributors and more particularly to an improved device for regulating the flow of material from a distributor.

There are presently available on the market a considerable number of highly concentrated chemical fertilizers. For efficient use, such fertilizers should be uniformly and precisely applied. Mobile fertilizer distributors or spreaders heretofore available have had gauge means by which the rate of flow of material from the distributor could be regulated. Such gauge means usually comprised a plurality of successive stops, the rate of flow from an opening being variable according to the particular stop elected to set the flow. However, no simple inexpensive means has been provided for varying the rate of flow infinitely and between successive stops.

One important object of this invention is to provide gauge means of the character described by which the rate of flow of fertilizer from a distributor may be infinitely varied.

Another object of this invention is to provide gauge means in a distributor having a hopper and a shutter for openings therein, said gauge means being operable against the shutter directly and not the means for adjusting same, whereby a more positive control of feeding or flow is provided.

Another object of this invention is to provide an improved gauge member for a fertilizer distributor.

A further object of this invention is to provide a gauge means including a primary adjustment means and a secondary adjustment means, said primary means serving for adjusting the flow of material from one rate to a next rate, and said secondary adjustment means serving for adjusting the flow between successive rates.

Other objects of this invention will be apparent hereinafter from the specification and from the recital in the appended claims.

In the drawings:

Fig. 2 is a plan view of Fig. 1; and

Fig. 3 is a fragmentary view of the gauge means of this invention, the fine adjustment means thereof being adjusted to a different position than that shown in Fig. 2.

Figure 1:
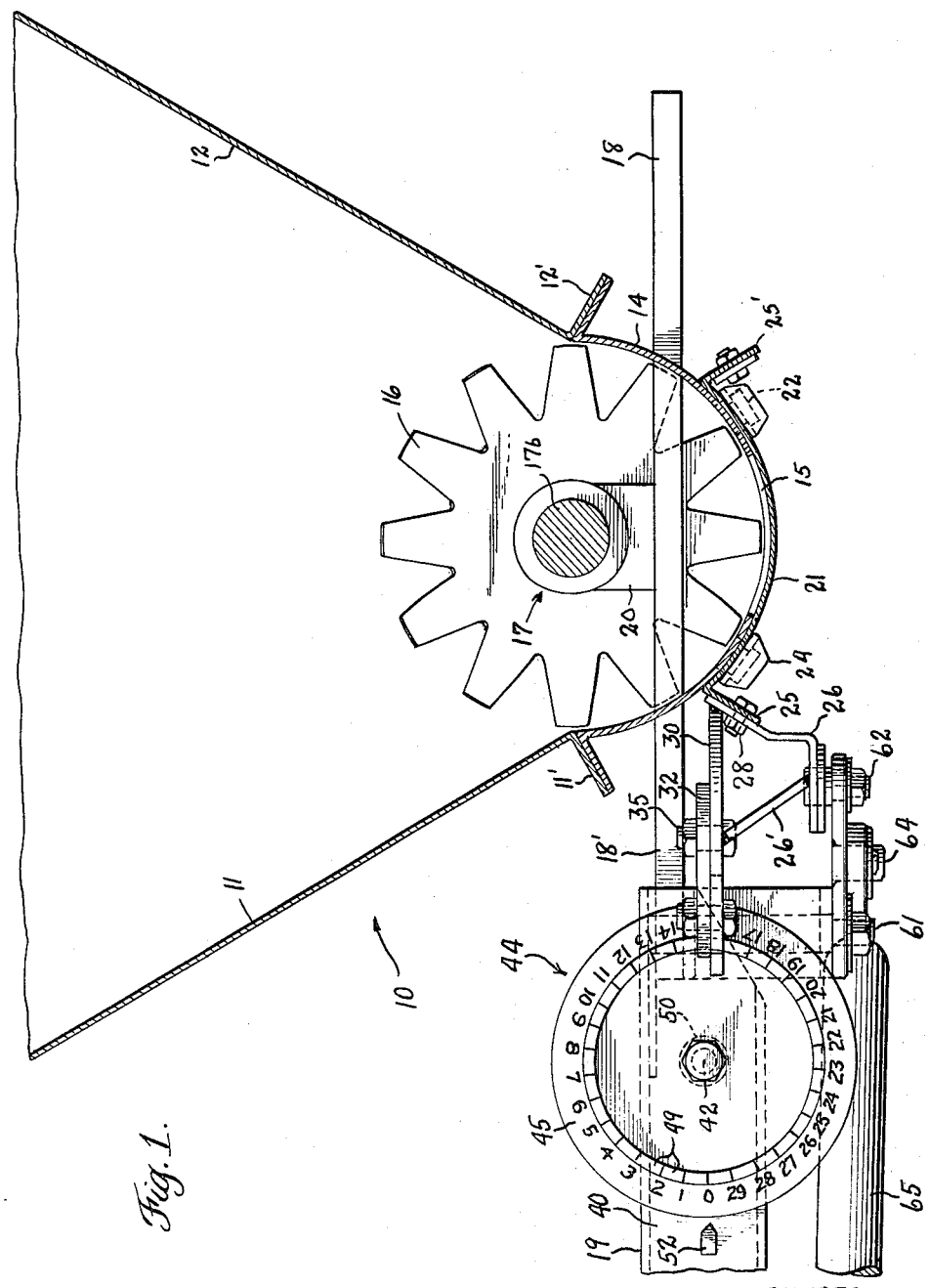
Fig. 1 is a fragmentary sectional view through a fertilizer distributor having improved gauge means constructed according to this invention, such section being taken on the lines 1—1 of Fig. 2 and looking in the direction of the arrows.

Referring now to the drawings by numerals of reference, 10 denotes a distributor hopper adapted to receive lime, fertilizer or some other fluent solid material. The hopper comprises a pair of opposed side walls, namely front wall 11 and rear wall 12. Such walls extend downwardly and toward each other being bent outwardly at their lower edges to form flanges 11' and 12'. Suitably fastened to these flanges, by means not shown, is a curved bottom wall 14 having a plurality of spaced rectangularly shaped discharge openings 15 therein.

Material dumped into the hopper falls by gravity toward bottom wall 14, the converging side walls directing the material toward the openings 15. To obtain a positive discharge of material, each opening 15 has a cooperative, peripherally toothed, agitator 16. The agitators for the respective openings are carried on shaft means 17 rotatable from a source of power, not shown.

The respective ends of the distributor hopper are supported by ground wheels, not shown. Extending through bottom wall 14 at the middle of the hopper 10 and transverse to the extension thereof is a support member 18 having an end 18' which projects forwardly of the hopper. Connected to member 18 is a tongue 19 by which the hopper may be connected to the drawbar of a tractor or other mobile power source for moving the distributor across a field.

Conventionally, hopper 10 is divided into two lateral halves or compartments of equal size, shape and design, each compartment having its own separately operable agitator mechanism whereby one side of the hopper can be operated while the other half is rendered inoperative. Mounted on plate 18 is a bearing-support 20 which supports respective inner ends of the shaft sections 17a and 17b.

To cover discharge openings 15 and regulate the flow of material from hopper 10 shutter member 21 is provided for the hopper. The shutter has triangularly shaped openings 23 registrable with the openings 15 in the bottom wall 14 of the hopper, there being one shutter opening for each hopper opening. The shutters are connected to the hopper for slideable movement relative thereto. Projecting outwardly from bottom wall 14 are T-shaped guide pins 22 which project into bayonet-like slots, not shown, in brackets 24 on the shutter.

The shutter 21 is of accurate configuration, conforming to the curved bottom of wall 14. It has downwardly turned longitudinally extending flanges namely forward flange 25 and rearward flange 25', Fig. 1. Connected to the forwardly disposed flange is a shutter bracket member 26 which extends laterally on opposite sides of tongue 19 Fig. 2. Member 26 is connected to flange 25 by bolt-nut means 28 which extend through elongate slots 29 whereby member 26 may be adjusted in a direction parallel to the longitudinal extent of the hopper.

Welded to member 26 is a forwardly extending triangular support plate 30 having a side edge 31 extending perpendicular to hopper 10 and parallel to tongue 19. Plate 30 is additionally supported by a brace member 26' (Fig. 1). Mounted on plate 30 is a fine adjustment stop member 32 having a straight edge 34 which extends beyond and parallel to edge 31 of plate 30. The fine adjustment stop member is connected to plate 30 by bolt-nut means 35 which project through slots 36 in plate 30. These slots extend at an angle relative to the edge 31 of plate 30. It will be apparent, that on loosening nut-bolt means 35 fine adjustment stop member 32 may be adjusted whereby its projection beyond edge 31 of plate 30 may be varied. Compare Figures 2 and 3.

Tongue 19 has a flat side 40 which extends vertically. Welded or otherwise secured to side 40 is a plate 41 having a hole 41' therein through which a bolt 42 projects. Mounted on an end of bolt 42 outside tongue 19 is a primary adjustment feed gauge 44 comprising a circular dial plate 45 extending parallel to plate 41. The dial plate has a circular bead 46 on one side face providing a line contact with the plate 41. Extending outwardly from the opposite side face of the dial plate is a cylindrical gauge member 48 having a plurality of segments 49 extending different distances from the dial plate and the ends of which provide successive steps. The first step is flush against the face of the dial plate and successive steps increase in distance from such face to a high point 49. The steps utilize the full 360° of the cylinder, each step being 12° wide.

Feed gauge 44 and plate 30 are so mounted that on lateral movement of shutter 21 the fine adjustment stop member 32 will come into engagement with a step on the feed gauge.

The end of bolt 42 extending into tongue 19 has a spring 50 mounted thereon and held under compression by nut 51 threaded onto the bolt. Spring 50 biases the feed gauge into tight abutting relationship with plate 41 thereby preventing inadvertent rotation of the feed gauge from an adjusted position. While spring 50 prevents rotation of the feed gauge from vibrations or the like, it may be readily manually overcome whereby a person grasping the feed gauge and pulling it axially outwardly from tongue 19 may rotate the feed gauge to a desired position.

Tongue 19 carries a fixed pointer 52 (Fig. 1) the pointed end of which is directed toward the feed gauge. In the illustration shown, the feed gauge has thirty steps, denoted on dial plate 45 from 0 to 29. When gauge 44 is rotationally positioned so that the pointer 52 points towards zero, the highest step on the feed gauge is 180° away and in position to be engaged by stop member 32. By rotating the feed gauge counterclockwise as shown in Fig. 1 the steps on the gauge diametrically opposite pointer 52 get less and less in distance from dial plate 45 until step 29 is reached which is flush with the outside face of the plate 45. The rotation may be stopped at any intermediate point to set the gauge at a desired step.

Triangular plate 30 is mounted in a position such that it extends in a horizontal plane just below the horizontal plane of rotation of the feed gauge. The fine adjustment stop plate 32 mounted on plate 30, however, is co-planer with the center of the gauge. Further, plate 30 and the fine adjustment plate 32 are so disposed that upon longitudinal movement of the shutter 21 the fine adjustment stop plate 32 may be brought into or out of engagement with the feed gauge.

Adjustment of shutter 21 is obtained by means of a bell crank 60 pivotally connected at 61 to tongue 19. The bell crank is pivotally connected at 62 to bracket member 26 connected to the shutter 21. Pivotally connected to the bell crank at 64 is a lever arm 65 which extends parallel to the tongue 19 and forwardly. Suitable means, not shown, is connected to lever arm 65 to reciprocate it. It will be apparent from Fig. 2, that on reciprocatory movement of lever 65, shutter 21 will be transversely moved.

In operation, the hopper is closed when lever 65 is positioned as shown in Fig. 2. The openings 23 in the shutters are out of register with the openings 15 in the bottom 14 of the hopper. When the operator pulls lever 65 forwardly, bell crank 60 is pivoted about 61 and bracket member 26 and shutter 21 is shifted toward the left of Fig. 2. It will be noted that the apex 23' of each triangular opening in the shutter faces the opening 15 which it controls. As the shutter moves toward the left, the opening 15 in the bottom of the hopper is gradually uncovered. Slight movement of the shutter will uncover the openings in the hopper a small amount. Movement of the shutter so that the openings 23 move in full register with openings 15 will provide the largest available openings. Stopping the shutter at an intermediate position will produce intermediate openings.

As shutter 21 moves towards open position, the fine adjustment stop member 32 on plate 30 will come into engagement with a step on feed gauge 44. It will be clear that the effective size of the openings in the hopper produced upon movement of the shutter toward open position will depend upon the rotary position of adjustment of the feed gauge 44. Since the feed gauge has 30 steps thereon, the shutter may be stopped at any one of these 30 positions, to thereby adjust the uncovering of openings 15 to any one of 30 positions. In Fig. 2, the feed gauge is adjusted to keep hopper openings closed.

Since the distribution of highly concentrated chemical fertilizers may require an adjustment finer than that provided by a 30 step gauge means, fine adjustment stop member 32 is mounted whereby it is adjustable on triangular plate 30. By loosening nut-bolt means 35 the fine adjustment stop can be adjusted whereby its extension beyond the edge 31 of plate 30 can be varied.

Therefore, the feed gauge provides a means for adjusting the shutter over a 30 step range. The fine adjustment stop 32, and the adjustable means therefor, provides a means for adjusting the stopping of the shutter between steps on the feed gauge. As a result, an infinitely variable adjustment is obtainable.

It will be noted, that the adjustment of the hopper is directly related and controlled by the feed gauge. This gives a very positive adjustment. Such constitutes a substantial improvement over prior devices wherein the amount of movement of a lever arm, such as lever 65, is controlled to regulate the adjustment of the shutter. Moreover, the particular form of feed gauge member which applicants provide constitutes a simple, inexpensive means of obtaining a primary adjustment while the fine adjustment or secondary means provides an easy "between steps" adjustment.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fail within the scope of the invention or the limits of the appended claims.

Having thus described our invention, what we claim is:

1. In a fertilizer distributor, a hopper having a discharge opening in the bottom thereof, a shutter normally covering said opening, means for moving said shutter relative to said hopper to uncover said opening and vary the effective size thereof, a feed gauge having a plurality of stop positions thereon for regulating the movement of said shutter, a support member, means connecting said feed gauge to said support member for adjustment, selectively, to one of the stop positions, a support plate, means connecting said support plate to said shutter whereby when the shutter is moved relative to said hopper said support plate is correspondingly moved, the disposition of said feed gauge and said support plate being such that movement of said shutter in one direction will bring an edge of said support plate toward engagement with said feed gauge member, a fine adjustment stop member, and means for adjustably mounting said stop member on said support plate to variably extend beyond said edge of the support plate for engagement with said one stop on said feed gauge.

2. In a fertilizer distributor, a hopper having a discharge opening, a movable shutter normally covering said opening, means for moving said shutter in one direction to uncover said opening, a rotatably adjustable feed gauge for regulating the movement of said shutter in said one direction, means mounting said feed gauge laterally spaced of said shutter and rotatably adjustable on an axis extending generally parallel to the direction of movement of said shutter, said feed gauge having a plurality of successive, angularly spaced steps thereon facing in a direction opposite to said one direction and each of which is operable to stop said shutter at a different position, a support plate connected to said shutter for movement therewith and projecting laterally relative thereto toward said feed gauge, said support plate having a side edge facing in said one direction, a fine adjustment stop member carried on said support plate and extending beyond said side edge, said stop member being engageable with a step on said feed gauge, the particular step engaged depending on the rotatably adjusted position of the gauge, and means for connecting said stop member to said plate to vary its extension beyond said side edge to thereby adjust the stopping of said shutter between successive steps on the feed gauge.

3. In a fertilizer distributor as recited in claim 2 wherein said feed gauge comprises a dial plate, mounted for rotation on said parallel axis, a coaxial cylindrical member affixed to one side of said dial plate and extending outwardly therefrom, said cylindrical member having segments extending varying distances from said dial plate and providing successive steps engageable with said fine adjustment stop member.

4. In a fertilizer distributor as recited in claim 3 wherein said dial plate is connected to a support member by means comprising a pin on which said dial plate is rotatable, spring means being provided for biasing said dial plate against said support member to frictionally resist rotation of the dial plate, said dial plate having a designation thereon for each step of said cylinder, and a fixed pointer carried on said support member and pointing toward said dial.

5. In a fertilizer distributor as recited in claim 2 wherein said side edge of said support plate extends generally perpendicular to said one direction of movement of said shutter and the axis of said feed gauge, said stop member having an edge extending beyond said side edge of said plate and parallel thereto, said means for connecting said stop member to said support plate comprising a connecting element extending through both the member and the plate, one of these two last-named parts having a slot extending at an angle to the perpendicular extension of said side edge.

6. In a fertilizer distributor as recited in claim 2 wherein said side edge of said support plate extends generally perpendicular to said one direction of movement of said shutter and the axis of said feed gauge, said stop member having an edge extending beyond said side edge and parallel thereto, said support plate having an elongate slot therein extending at an angle to said side edge, said stop member having a hole therein, and a connecting element extending through said hole and slot, the extension of said stop member beyond said side edge being variable upon adjustment of said connecting element in said slot.

7. In a fertilizer distributor, a hopper having a discharge opening, a movable shutter normally covering said opening, means for moving said shutter in one direction to uncover said opening, a rotatably adjustable cylindrical feed gauge for regulating the movement of said shutter in said one direction, means mounting said feed gauge laterally spaced of said shutter and rotatably adjustable on an axis extending generally parallel to the direction of movement of said shutter, said feed gauge having a plurality of successive, angularly and axially spaced steps at one axial end thereof facing in a direction opposite to said one direction and each of which is operable to stop said shutter at a different position, a support plate carried on said shutter for movement therewith and projecting laterally relative thereto toward said feed gauge, said support plate having a side edge facing in said one direction, said side edge being engageable with a step on said feed gauge, the particular step engaged depending on the rotatably adjusted position of the gauge, and means interposed between said feed gauge and said mounting means resiliently restraining the feed gauge in adjusted position.

References Cited in the file of this patent

UNITED STATES PATENTS

| | | |
|---|---|---|
| 2,634,029 | Juzwiak | Apr. 7, 1953 |
| 2,710,116 | Juzwiak | June 7, 1955 |
| 2,718,986 | Peoples | Sept. 27, 1955 |
| 2,779,507 | Rader | Jan. 29, 1957 |